July 26, 1927.

C. BORNMANN 1,637,213

FOCUSING INDICATOR FOR CAMERAS

Filed May 13, 1926

INVENTOR
CARL BORNMANN.
BY Philip S. Hopkins
ATTORNEY

Patented July 26, 1927.

1,637,213

UNITED STATES PATENT OFFICE.

CARL BORNMANN, OF BINGHAMTON, NEW YORK, ASSIGNOR TO ANSCO PHOTOPRODUCTS, INC., OF BINGHAMTON, NEW YORK.

FOCUSING INDICATOR FOR CAMERAS.

Application filed May 13, 1926. Serial No. 108,871.

A popular form of photographic camera of the folding type is what is generally known as the "fixed focus" camera. In such a camera, no focusing is generally required inasmuch as it is so constructed that the operator need merely pull out the sliding front of the camera, on the platform, to a fixed stop provided there by the manufacturer, and at such point, the lens in the camera will occupy such relative position to the film that objects to substantially all distances from the camera will be reproduced fairly sharp upon the film. Because of this fact, the usual focusing lever or other focusing device is omitted from the construction of such a "fixed focus" camera.

Due to the absence of such a focusing device, these cameras have heretofore been limited in their use to roll film, the focal plane of which is always in the same position, or plane within the camera body. An operator therefore, who might desire to use one of the well known plate or cut film holders, or adaptors on his camera, is unable to do so, because as is well known, such a holder or adaptor changes substantially the focal plane of the sensitized material used as a negative. Therefore on the fixed focus type of camera with no focusing device provided, it is practically impossible to effectively use such an adaptor or holder with success.

To overcome this difficulty, I have provided a means whereby a fixed focus roll film camera can be used with equal facility with a plate or cut film holder or adaptor. My invention eliminates the use of the troublesome and sometimes complicated focusing scales and devices, formerly required to change the focus of the lens, and provides a means whereby the same camera may be used as a fixed focus camera when a plate or cut film holder or adaptor is used in connection therewith.

A better understanding of my invention may be had by reference to the accompanying drawing wherein like reference numerals indicate like parts.

Figure 1:
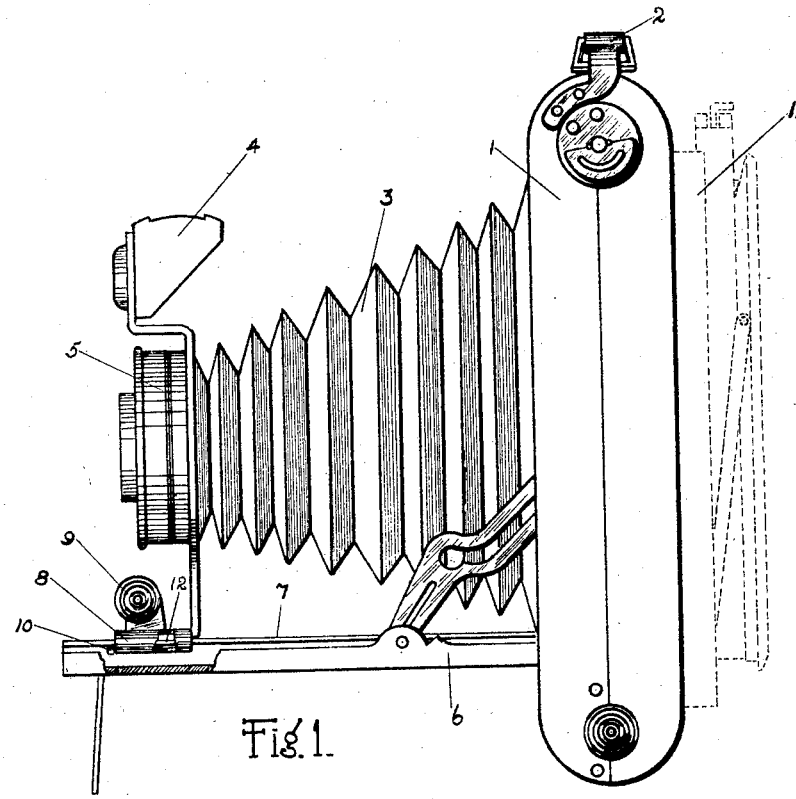
Figure 1 is a side view of a photographic camera of the character just described, showing in dotted lines the usual plate or cut film holder or adaptor attached thereto.
Figure 2:
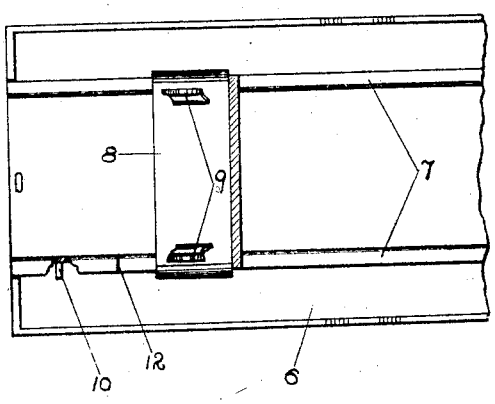
Figure 2 is a detail plan view of the platform of the camera illustrating clearly the operation of my invention.

A camera of the usual folding type is illustrated at 1, and provided with the handle 2, bellows 3, view finder 4, lens and shutter 5, and platform 6, provided with the rails 7, upon which the sliding front 8 may be slid by means of the finger grips 9.

Carried by one of the rails 7, at a point adjacent the outer end thereof, is a stop member 10 so positioned that when the sliding front 8 is pulled out and engages said stop member, the lens will be in properly focused relation to the plane of the roll film (not shown) within the body 1 of the camera.

If it is now desired to use a plate or cut film holder or adaptor of the type shown in dotted lines in Figure 1, and designated 11, it will be understood that the focus must be changed because the focal plane of the sensitized elements carried by the holder or adaptor 11 is now located considerably back of the plane occupied by the roll film in the camera. At a predetermined point on one of the rails 7, I therefore provide an indicating mark or device 12, which may simply consist of a scratch or groove, across the top of the rail, filled with enamel or other material of a distinguishing color. The relation of this indicating mark 12 to the focal plane of the sensitized elements in the plate holder is the same as that of the stop 10 to the focal plane of the roll film within the camera.

It will be understood therefore, that when the plate holder or adaptor is used, the sliding front 8 is simply moved along on the rail 7 until the front edge of the front 8 reaches the indicator 12, at which position the camera will be properly focused for objects at substantially all distances from the camera.

It will be seen therefore that by my arrangement, I have provided a fixed focus camera, which may be used as such, with either roll film or the cut film or plate adaptor.

Changes may be made in details without departing from the spirit of the invention. I do not limit myself therefore to the exact form shown other than by the appended claim.

I claim:—

A camera comprising a body adapted to receive a sensitized medium in either one of two parallel planes, a platform, and a front slidable thereon for focusing, stop means on said platform for said front at a single predetermined point of fixed focus in relation to one of said planes, and an indicator mark on said platform for said front at a single predetermined point of fixed focus in relation to the other of said planes.

CARL BORNMANN.